(12) United States Patent
Wan et al.

(10) Patent No.: US 11,451,005 B2
(45) Date of Patent: Sep. 20, 2022

(54) ALL-FIBER AIRTIGHT PACKAGING STRUCTURE AND METHOD WITH SEMICONDUCTOR SATURABLE ABSORBER MIRROR

(71) Applicant: WUHAN YANGTZE SOTON LASER CO. LTD., Wuhan (CN)

(72) Inventors: Wei Wan, Hubei (CN); Kangkang Chen, Hubei (CN); Fei He, Hubei (CN); Si Zou, Hubei (CN); Jianxin Luo, Hubei (CN)

(73) Assignee: WUHAN YANGTZE SOTON LASER CO. LTD., Wuhan (CN)

( * ) Notice: Subject to any disclaimer, the term of this patent is extended or adjusted under 35 U.S.C. 154(b) by 174 days.

(21) Appl. No.: 16/792,321

(22) Filed: Feb. 17, 2020

(65) Prior Publication Data
US 2020/0266602 A1  Aug. 20, 2020

(30) Foreign Application Priority Data
Feb. 19, 2019  (CN) .......................... 201910120929.0

(51) Int. Cl.
*H01S 3/11* (2006.01)
*H01S 3/067* (2006.01)
*H01S 3/04* (2006.01)

(52) U.S. Cl.
CPC .......... *H01S 3/1118* (2013.01); *H01S 3/0401* (2013.01); *H01S 3/0405* (2013.01); *H01S 3/06704* (2013.01)

(58) Field of Classification Search
CPC .... H01S 3/1115; H01S 3/1118; H01S 3/0401; H01S 3/0405; G02B 6/4268–4272;
(Continued)

(56) References Cited

U.S. PATENT DOCUMENTS 5,381,494 A * 1/1995 O'Donnell ........... G02B 6/4202
385/91
9,810,786 B1 * 11/2017 Welford ................ H01S 3/1086
(Continued)

FOREIGN PATENT DOCUMENTS

| CN | 105196039 | * 12/2015 | ............ B23P 19/027 |
| CN | 210490310 | * 2/2020 | ............... H02G 3/02 |

(Continued)

*Primary Examiner* — Xinning(Tom) Niu
*Assistant Examiner* — Delma R Fordé
(74) *Attorney, Agent, or Firm* — Andrew C. Cheng

(57) ABSTRACT

An all-fiber airtight packaging structure with semiconductor saturable absorber mirror includes a ceramic optical fiber ferrule connector, a SESAM, a SESAM fixed block, a TEC chilling plate, a sealing shell, and a cover plate. The cover plate seals the sealing shell by connecting to a sealing shell surface. The TEC chilling plate and the SESAM fixed block are set in the sealing shell. The SESAM fixed block is located above the TEC chilling plate. The SESAM is pasted on the SESAM fixed block. A sealing shell central hole is defined in the sealing shell. The ceramic optical fiber ferrule connector is entered into the sealing shell through the sealing shell central hole, and an output end of ceramic optical fiber ferrule connector is opposited to an end of SESAM which is mounted on the SESAM fixed block.

8 Claims, 4 Drawing Sheets

(58) Field of Classification Search
CPC ........ G02F 1/00; G02F 1/0102; G02F 1/0105; G02F 1/0107; G02F 1/015–0157; G02F 2201/34; G02F 2201/343; G02F 2201/346; G02F 2203/02; H01L 23/34; H01L 23/02; H01L 23/04; H01L 23/053; H01L 23/38; H01L 23/40
See application file for complete search history.

(56) References Cited

U.S. PATENT DOCUMENTS

| | | | | |
|---|---|---|---|---|
| 2003/0044131 | A1* | 3/2003 | Stewart | G02B 6/4271 |
| | | | | 385/88 |
| 2010/0103960 | A1* | 4/2010 | Kasamatsu | H01S 3/1118 |
| | | | | 372/18 |
| 2014/0114131 | A1* | 4/2014 | Sakai | A61B 1/0011 |
| | | | | 600/182 |
| 2018/0351321 | A1* | 12/2018 | Pino | G02B 27/30 |

FOREIGN PATENT DOCUMENTS

| | | | | | |
|---|---|---|---|---|---|
| CN | 112186479 | A | * | 1/2021 | ........... H01S 3/0071 |
| CN | 212277618 | | * | 1/2021 | ............. H01S 5/022 |
| CN | 112415679 | A | * | 2/2021 | ........... G02B 6/4254 |
| CN | 112864788 | A | * | 5/2021 | ............. H01S 3/025 |

* cited by examiner

ALL-FIBER AIRTIGHT PACKAGING STRUCTURE AND METHOD WITH SEMICONDUCTOR SATURABLE ABSORBER MIRROR

CROSS-REFERENCE TO RELATED APPLICATIONS

This application claims priority to Chinese Application No. 201910120929.0 filed on Feb. 19, 2019, the contents of which are incorporated herein by reference.

TECHNICAL FIELD

The present invention relates to laser technology field, especially for an all-fiber airtight packaging structure with semiconductor saturable absorber mirror and a method of same.

BACKGROUND

The mode-locked fiber laser which is produced with Semiconductor Saturable Absorber Mirror (SESAM) can produce ultrashort pulse in a range from picosecond ($10^{-12}$ seconds) to femtosecond ($10^{-15}$ seconds), which is one of the most important applications of SESAM. The mode-locked fiber laser has the advantages of simple and compact structure, and stable and reliable performance. The ultrashort pulse which is produced by the mode-locked fiber laser has important applications in bellow fields: optical coherence tomography (OCT) medicine, micromachining, high-speed photography or molecular ultrafast dynamics, and so on. The SESAM is one of the most important components of passive mode-locked fiber laser which can produce ultrashort pulse.

The SESAM was originally proposed by U. Keller in 1992. The SESAM is a combination of a reflector and a saturable absorber. The SESAM includes a substrate used with GaAs, a semiconductor distributed Bragg mirror grown alternately by GaAs and AlAs, and an InGaAs/GaAs quantum well located above the distributed Bragg mirror. Compared with ordinary semiconductor saturable absorber, the SESAM has the advantages of low insertion loss, adjustable central wavelength, and simple laser resonator structure. These advantages encourage lots of cutting-edge technical and scientific workers to creatively use SESAM mode locking technology and constantly break records in the field of ultrashort pulses.

However, the SESAM is easy to be damaged to have short life, which prevents the large scale commercial use of SESAM. The two main damage reasons for the SESAM are a thermal damage caused by rising temperature of SESAM, and a non-thermal damage caused by high peak power due to Q modulation instability. The peculiarity of easy to be damaged is not only related to the selection of SESAM materials, production process of SESAM, but also related to the usage and heat treatment of SESAM. When the SESAM is used, a surface of the SESAM must to be clean and dry, the input light power should also be reduced to decrease the increasing heat of SESAM, and the heat dissipation of SESAM should be increased as much as possible. The packaging and heat dispersion of SESAM play decisive roles in the useful life of SESAM.

Currently, there are two methods to packaging the SESAM which is used in mode-locked fiber lasers. The first method is pasting the SESAM on a copper base, and realizing the coupling between the optical fiber and SESAM by a pair of lenses. The second method is pasting the SESAM directly on the FC optical fiber patch cord. The first packaging method has great heat dissipation performance with a copper base and the SESAM can be damaged for several times with larger SESAM area. However, the first packaging method is complicated and expensive, and is difficult to be debugged. In further, the optical coupling of the first packaging method is greatly affected by working environment, so it is not suitable for long-term stable operation of lasers. The second packaging method is simple and needs low cost. The second packaging method not only reduces the volume of the passive mode-locked fiber laser, but also improves the stability of the laser. However, the heat dissipation performance of the second packaging method is now well. The useful life of the SESAM packaged by the second packaging method is shorter than the SESAM packaged by the first packaging method. In further, the SESAM packaged by the second packaging method can only be used once.

SUMMARY OF INVENTION

In order to solve the above problems, the present invention provides an all-fiber airtight packaging structure with semiconductor saturable absorber mirror, which not only has the advantages of simple structure and low cost and easy debugging, but also has the advantages of excellent heat dissipation performance and large working temperature range and reusable Semiconductor Saturable Absorber Mirror (SESAM). The all-fiber airtight packaging structure with semiconductor saturable absorber mirror can greatly improve the useful life of the mode-locked fiber laser. The all-fiber airtight packaging structure with semiconductor saturable absorber mirror is very conducive to industrial application and mass production. The present invention also provides an all-fiber airtight packaging method with semiconductor saturable absorber mirror.

The present invention provides an all-fiber airtight packaging structure with semiconductor saturable absorber mirror, which comprising a ceramic optical fiber ferrule connector, a SESAM, a SESAM fixed block, a Thermo Electric Cooler (TEC) chilling plate, a sealing shell, and a cover plate. The cover plate seals the sealing shell by connecting to a surface of the sealing shell. The TEC chilling plate and the SESAM fixed block are both set in the sealing shell. The SESAM fixed block is located above the TEC chilling plate. The TEC chilling plate is used to control the temperature of the SESAM fixed block, so that the SESAM can work within ±0.1° C. The SESAM is pasted on the SESAM fixed block. A sealing shell central hole is defined in the sealing shell. The ceramic optical fiber ferrule connector is entered into the sealing shell through the sealing shell central hole, and an output end of the ceramic optical fiber ferrule connector is opposited to an end of the SESAM which is mounted on the SESAM fixed block.

According to the present invention, a structure of the SESAM fixed block is convex, a SESAM fixed area is set on the SESAM fixed block, the SESAM is pasted on the SESAM fixed area by ultraviolet curing adhesives or thermal curing adhesives or heat-conducting silicone rubber.

According to the present invention, two SESAM fixed block mounting holes are defined in the SESAM fixed block, two SESAM fixed block mounting screw holes are defined in the sealing shell, the SESAM fixed block is fixed on the sealing shell through two bolts respectively passing through the SESAM fixed block mounting screw holes and the SESAM fixed block mounting holes, the SESAM fixed block can move within the sealing shell because the SESAM fixed block mounting holes are rectangle, which ensures that other areas of SESAM can be used by moving the SESAM fixed block when an area of the SESAM is damaged.

According to the present invention, the ceramic optical fiber ferrule connector comprises an optical fiber and a ceramic optical fiber ferrule, the optical fiber is fixed in a central hole of the ceramic optical fiber ferrule by thermal curing adhesives, the optical Fiber can be polarization-maintaining single-mode optical fiber or non-polarization-maintaining single-mode optical fiber.

According to the present invention, the ceramic optical fiber ferrule connector can also be GRIN lens or C-lens or space light coupled structure with lens.

According to the present invention, two sealing shell wiring pins are defined on the sealing shell, two sealing shell wiring pins are connected to two TEC chilling plate wiring pins by copper wires.

According to the present invention, a gap between the ceramic optical fiber ferrule connector and the sealing shell central hole is filled with ultraviolet curing adhesives.

According to the present invention, the SESAM fixed block, the sealing shell, and the cover plate are made from copper material.

According to the present invention, a tail fiber of ceramic optical fiber ferrule connector is connected to a mode-locked fiber laser.

The present invention also provides an all-fiber airtight packaging method with semiconductor saturable absorber mirror, which comprising following steps:

S1, removing the coating of an optical fiber and wiping the optical fiber clean, then filling thermal curing adhesives in a central hole of a ceramic optical fiber ferrule, and inserting the optical fiber without coating into the central hole of the ceramic optical fiber ferrule to form a ceramic optical fiber ferrule connector, heating and curing the ceramic optical fiber ferrule connector, and smoothing the output end of ceramic optical fiber ferrule connector by grinding machine, coating or uncoating the smoothing end face.

S2, smearing heat-conducting silicone rubber evenly on a TEC chilling plate placement area which is set in a sealing shell, putting a TEC chilling plate on the TEC chilling plate placement area, and respectively connecting two TEC chilling plate wiring pins with two sealing shell wiring pins on the sealing shell.

S3, smearing sealant evenly on a surface of a SESAM fixed area which is set on a SESAM fixed block, then putting a SESAM on the central position of the SESAM fixed area and pasting the SESAM on the SESAM fixed area.

S4, smearing heat-conducting silicone rubber on a surface of the TEC chilling plate, then putting the SESAM fixed block of step S3 on the TEC chilling plate and fixing the SESAM fixed block in the sealing shell by bolts.

S5, fixing the ceramic optical fiber ferrule connector of step S1 by a multidimensional adjusting bracket, aligning the output end of the ceramic optical fiber ferrule connector to a surface of the SESAM, and then inserting the ceramic optical fiber ferrule connector into a sealing shell central hole which is defined in the sealing shell, connecting a tail fiber of the ceramic optical fiber ferrule connector to a mode-locked fiber laser cavity, adjusting the multidimensional adjusting bracket to make the output end of the ceramic optical fiber ferrule connector getting closer to the surface of the SESAM, meanwhile, changing the angle between the output end of the ceramic optical fiber ferrule connector and the surface of the SESAM until reaching a laser mode locked status.

S6, filling a gap between the ceramic optical fiber ferrule connector and the sealing shell central hole with ultraviolet curing adhesives, curing the ultraviolet curing adhesives by ultraviolet light, the ultraviolet curing adhesives must be filled in the gap between the ceramic optical fiber ferrule connector and the sealing shell central hole, applying ultraviolet curing adhesives to the ceramic optical fiber ferrule connector and the sealing shell central hole evenly.

S7, putting the sealing shell of step S6 in a dry environment, and then sealing the sealing shell by welding a cover plate on a surface of the sealing shell.

According to the present invention, in step S3, the sealant can be chosen among ultraviolet curing adhesives, thermal curing adhesives, and heat-conducting silicone rubber; in step S7, the dry environment can be a dry $N_2$ environment or a dry vacuum environment or a dry clean air environment.

The technical solution provided by the present invention has beneficial effects:

(1) By fixing the SESAM on an independent copper SESAM fixed block, the present invention not only improves the heat dissipation performance and the useful life of SESAM, but also improves the usage rate and reduces production cost of the laser by taking out the SESAM fixed block and reusing it when the experimental parameters need to be changed or the SESAM is damaged.

(2) By placing the SESAM fixed block on the TEC chilling plate, the present invention enables the SESAM to work at a constant temperature and improves the stability of the laser.

(3) By packaging the SESAM in a dry $N_2$ environment, the present invention reduces the deliquescence of SESAM due to humidity environment and greatly improves the useful life of SESAM.

(4) The operation is simple and the cost is low for the packaging method provided by the present invention, and the packaging method provides an airtight and homothermal SESAM packaging structure with excellent heat dissipation performance, the packaging structure is simple, compact, and reusable, which is conducive to the miniaturization for mass production of the laser.

DETAILED DESCRIPTION

In order to make the purpose and technical solution and advantages of the present invention to be clearer, implementations of the present invention will be further described with reference to the attached figures.

Figure 1:
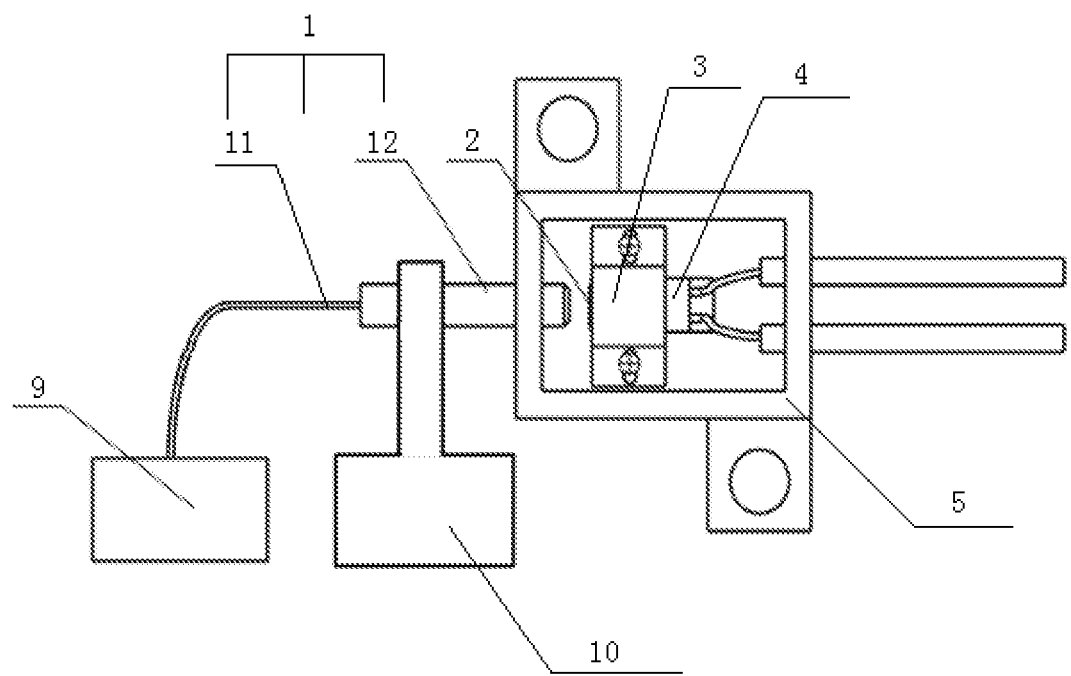
FIG. 1 is a structure diagram of an all-fiber airtight packaging structure with semiconductor saturable absorber mirror.
Figure 2:
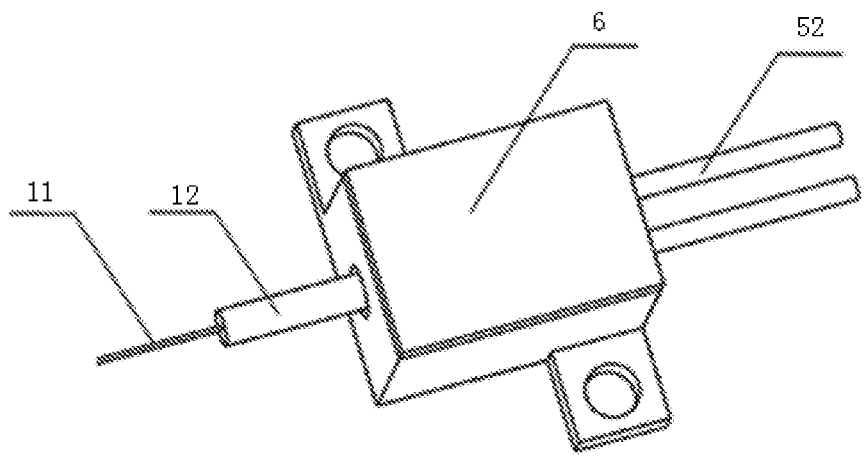
FIG. 2 is an assembly diagram of a sealing shell and a ceramic optical fiber ferrule connector of the all-fiber airtight packaging structure with semiconductor saturable absorber mirror of FIG. 1.

Refer to FIG. 1 and FIG. 2, in the embodiment of the present invention, an all-fiber airtight packaging structure with semiconductor saturable absorber mirror includes: a ceramic optical fiber ferrule connector 1, a Semiconductor Saturable Absorber Mirror (SESAM) 2, a SESAM fixed block 3, a Thermo Electric Cooler (TEC) chilling plate 4, a sealing shell 5, and a cover plate 6.

Figure 3:
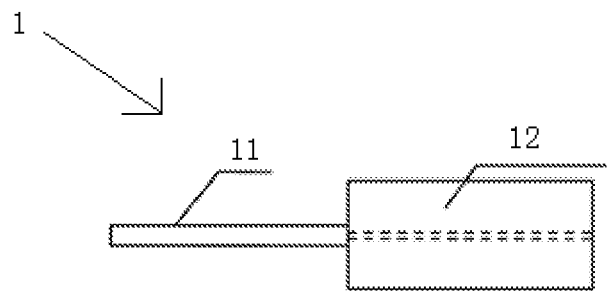
FIG. 3 is a lateral structure diagram of a ceramic optical fiber ferrule connector of the all-fiber airtight packaging structure with semiconductor saturable absorber mirror of FIG. 1.
Figure 4:
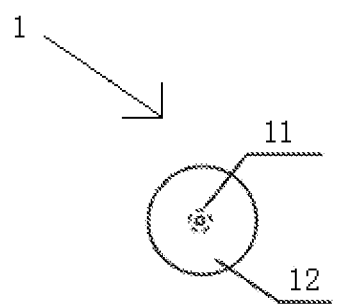
FIG. 4 is a structure diagram of an output end of a ceramic optical fiber ferrule connector of the all-fiber airtight packaging structure with semiconductor saturable absorber mirror of FIG. 1.

Refer to FIG. 3 and FIG. 4, the ceramic optical fiber ferrule connector 1 includes an optical fiber 11 and a ceramic optical fiber ferrule 12. The optical fiber 11 is fixed in a central hole of ceramic optical fiber ferrule 12 by thermal curing adhesives. The optical fiber 11 can be polarization-maintaining single-mode optical fiber or non-polarization-maintaining single-mode optical fiber.

Figure 5:
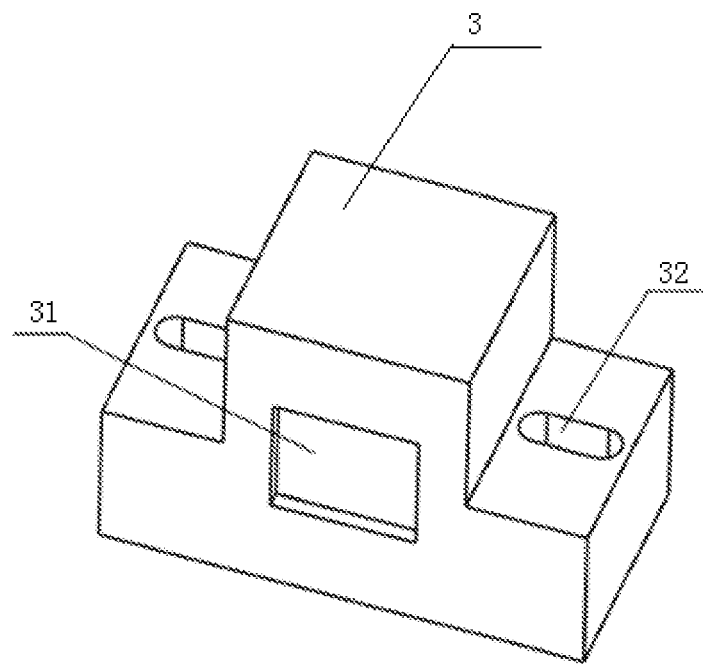
FIG. 5 is a structure diagram of a SESAM fixed block of the all-fiber airtight packaging structure with semiconductor saturable absorber mirror of FIG. 1.

Refer to FIG. 5, a structure of the SESAM fixed block 3 is convex. The SESAM fixed block 3 is made of copper material. The SESAM fixed block 3 includes a SESAM fixed area 31 and two SESAM fixed block mounting holes 32. The SESAM fixed area 31 is used to place the SESAM 2 thereon. The SESAM fixed area 31 is a concave rainure which is set on a convexity of the SESAM fixed block 3. The size of the SESAM fixed area 31 is larger than that of the SESAM 2. The SESAM 2 is pasted on the SESAM fixed area 31 by ultraviolet curing adhesives or thermal curing adhesives or heat-conducting silicone rubber. A shape of the SESAM fixing hole 32 is rectangle, and the SESAM fixed block 3 can be moved in the sealing shell 5. Therefore, when an area of the SESAM 2 is damaged, other areas of the SESAM 2 can be used by moving the SESAM fixed block 3.

Figure 6:
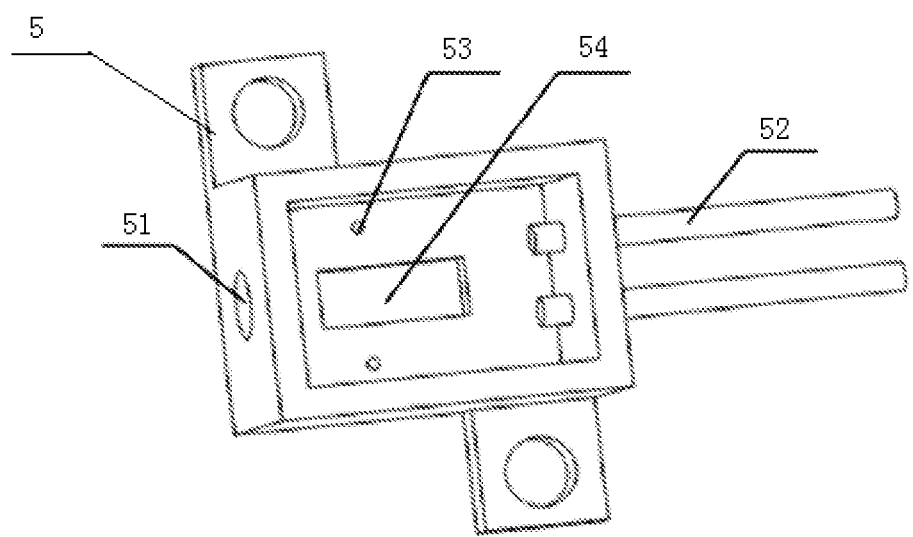
FIG. 6 is a structure diagram of a sealing shell of the all-fiber airtight packaging structure with semiconductor saturable absorber mirror of FIG. 1.
Figure 7:
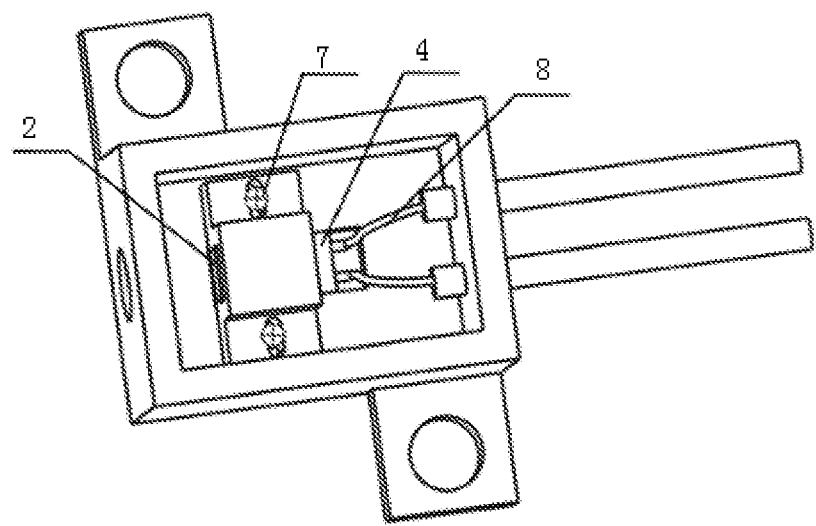
FIG. 7 is an installation structure diagram of a TEC chilling plate and a SESAM fixed block of the all-fiber airtight packaging structure with semiconductor saturable absorber mirror of FIG. 1.

Refer to FIG. 6 and FIG. 7, the sealing shell 5 includes a central hole 51 and two sealing shell wiring pins 52. The ceramic optical fiber ferrule connector 1 enters into the sealing shell 5 through the sealing shell central hole 51. The gap between the ceramic optical fiber ferrule connector 1 and the sealing shell central hole 51 is sealed by filling with ultraviolet curing adhesives. The output end of ceramic optical fiber ferrule connector 1 faces to the opposite side of the end of SESAM 2. Two SESAM fixed block mounting screw holes 53 and a TEC chilling plate placement area 54 are set in the sealing shell 5. The TEC chilling plate placement area 54 is used to place TEC chilling plate 4 thereon. The TEC chilling plate placement area 54 is a concave rainure which is set on the bottom of the sealing shell 5. The SESAM fixed block 3 is located above the TEC chilling plate 4. The SESAM fixed block 3 is fixed on the sealing shell 5 through two bolts 7 respectively passing through the SESAM fixed block mounting screw holes 53 and the SESAM fixed block mounting holes 32. The sealing shell wiring pins 52 and two wiring pins of the TEC chilling plate 4 are respectively connected by copper wires 8. The TEC chilling plate 4 has the functions of heating and cooling. The TEC chilling plate 4 is used to control the temperature of the SESAM fixed block 3, so that the SESAM 2 can work within ±0.1° C., and the stability of mode-locked fiber laser is improved. The sealing shell 5 is made of copper material. The gas environment in the sealing shell 5 can be a dry $N_2$ environment or a dry vacuum environment or a dry clean air environment.

The sealing shell 5 is sealed by welding the cover plate 6 on the surface of the sealing shell 5 by the American parallel weld system Miyachi Benchmark SM8500.

In the embodiment of the present invention, an all-fiber airtight packaging method with semiconductor saturable absorber mirror includes following steps:

In step S1, the coating of the optical fiber is removed, the optical fiber is a polarization-maintaining single-mode optical fiber, and the optical fiber is 2 centimeters long, the optical fiber is wiped clean by the lens wiping paper with ethyl alcohol, then the central hole of ceramic optical fiber ferrule 12 is filled with some thermal curing adhesives, and the optical fiber 11 without coating is inserted into the central hole of ceramic optical fiber ferrule 12 to form a ceramic optical fiber ferrule connector 1, the ceramic optical fiber ferrule connector 1 is heated and cured, and the output end of ceramic optical fiber ferrule connector 1 is smoothed by optical fiber grinding machine, the smoothing end face is coated or uncoated.

In step S2, a small number of heat-conducting silicone rubber is smeared evenly on a TEC chilling plate placement area 54 in the sealing shell 5, a TEC chilling plate 4 is put on the TEC chilling plate placement area 54, and two wiring pins of the TEC chilling plate 4 are respectively connected with two sealing shell wiring pins 52 on the sealing shell 5 by copper wires 8.

In step S3, a small number of ultraviolet curing adhesives are smeared evenly on the surface of a SESAM fixed area 31 which is set on a SESAM fixed block 3, then the SESAM 2 is put on the central position of the SESAM fixed area 31 by plastic flat tweezer, the ultraviolet curing adhesives are cured by using ultraviolet lamp to illuminate the surface of SESAM fixed area 31 uniformly.

In step S4, a small number of heat-conducting silicone rubber is smeared on the surface of TEC chilling plate 4, then the SESAM fixed block 3 of step S3 is put on the TEC chilling plate 4, and the SESAM fixed block 3 is fixed in the sealing shell 5 by two bolts 7 screwed in two SESAM fixed block mounting screw holes 53 of the sealing shell 5.

In step S5, the ceramic optical fiber ferrule connector 1 of step S1 is fixed by a multidimensional adjusting bracket 10, the output end of ceramic optical fiber ferrule connector 1 is aligned to the surface of the SESAM 2, and then the ceramic optical fiber ferrule connector 1 is inserted into the sealing shell central hole 51 which is defined in the sealing shell 5, the tail fiber of ceramic optical fiber ferrule connector 1 is connected with a mode-locked fiber laser 9 cavity, the multidimensional adjusting bracket 10 is adjusted to make the output end of ceramic optical fiber ferrule connector 1 getting closer to the surface of the SESAM 2, meanwhile, the angle between the output end of the ceramic optical fiber ferrule connector 1 and the surface of the SESAM 2 is changed until reaching the laser mode locked status.

In step S6, the gap between the ceramic optical fiber ferrule connector 1 and the sealing shell central hole 51 is filled with ultraviolet curing adhesives, the ultraviolet curing adhesives are cured by ultraviolet light.

In step S7, the sealing shell 5 of step S6 is put in a dry $N_2$ environment, and then the sealing shell 5 is sealed by welding the cover plate 6 on the surface of the sealing shell 5 by the American parallel weld system Miyachi Benchmark SM8500, following the above steps, an all-fiber airtight packaging structure with semiconductor saturable absorber mirror is made, the gas environment in the sealing shell 5 is a dry $N_2$ environment.

In the all-fiber airtight packaging structure with semiconductor saturable absorber mirror provided by the embodiment of the present invention, the distance between the output end of ceramic optical fiber ferrule connector 1 and the end of SESAM 2 is in the range from 0 to several microns. The light is coupled from the ceramic optical fiber ferrule connector 1 to the SESAM 2, and the reflected light from the SESAM 2 is coupled to the ceramic optical fiber ferrule connector 1. When an area of the surface of SESAM 2 is damaged or the working area of the surface of SESAM 2 needs to be changed, the relative position of the SESAM fixed block 3 can be moved by loosening two bolts 7 on the SESAM fixed block 3. By this way, repeated usage of SESAM 2 can be realized and the production cost of laser can be reduced. If the SESAM 2 is damaged, the entire SESAM fixed block 3 can be taken out and reused. In other words, the entire SESAM fixed block 3 is taken out, the surface of the SESAM 2 is cleaned with cotton swabs which are with alcohol, and then the SESAM 2 can be putted in a new sealing shell 5.

The present invention not only realizes the all-fiber airtight packaging structure of semiconductor saturable absorber mirror, but also realizes the SESAM 2 to work at a dry constant temperature, it improves the stability of the mode-locked fiber laser. Meanwhile, it greatly improves the useful life of laser. In the present invention, when a working area of SESAM 2 is damaged or the mode-locked parameters need to be changed, the repeated usage of SESAM 2 can be achieved by taking out the SESAM fixed block 3 and changing its location and packaging it again.

The localities of front, back, below, above, and other localities as involved herein are defined by the position of the parts in the figures and the position between the parts, only for expressing the clarity and convenience of the technical solution. It should be understood that the usage of the localities shall not to be considered as limiting the scope of the application claimed herein.

The above embodiment and the characteristics of the above embodiment in this article can be combined with each other without conflict.

The embodiment described above is only a better embodiment of the present invention, and it is not to be considered as limiting of the present invention, any modifications, substitutions, improvements and so on within the spirits and principles of the present invention shall be included in the scope of the present invention described herein.

What is claimed is:

1. An all-fiber airtight packaging structure with semiconductor saturable absorber mirror, comprising:
   a ceramic optical fiber ferrule connector;
   a SESAM;
   a SESAM fixed block;
   a TEC chilling plate;
   a sealing shell; and
   a cover plate;
   wherein the cover plate seals the sealing shell by connecting to a surface of the sealing shell, the TEC chilling plate and the SESAM fixed block are both set in the sealing shell, the SESAM fixed block is detachable fixed in the sealing shell, the SESAM fixed block is located above the TEC chilling plate, the SESAM is pasted on the SESAM fixed block, a sealing shell central hole is defined in the sealing shell, the ceramic optical fiber ferrule connector is entered into the sealing shell through the sealing shell central hole, and an output end of the ceramic optical fiber ferrule connector faces an end of the SESAM which is mounted on the SESAM fixed block; the ceramic optical fiber ferrule connector comprises an optical fiber and a ceramic optical fiber ferrule, the optical fiber is fixed in a central hole of the ceramic optical fiber ferrule by thermal curing adhesives; and
   wherein mounting holes are defined in the SESAM fixed block to allow two fasteners respectively to pass through to fix with the shell, the mounting holes being waist type holes so that the SESAM fixed block can be fixed in the shell in multiple positions.

2. The all-fiber airtight packaging structure with semiconductor saturable absorber mirror of claim 1, wherein:
   a structure of the SESAM fixed block is convex, a SESAM fixed area is set on the SESAM fixed block, the SESAM is pasted on the SESAM fixed area by ultraviolet curing adhesives or thermal curing adhesives or heat-conducting silicone rubber.

3. The all-fiber airtight packaging structure with semiconductor saturable absorber mirror of claim 1, wherein:
   two SESAM fixed block mounting screw holes are defined in the sealing shell, the SESAM fixed block is fixed on the sealing shell through two bolts respectively passing through the SESAM fixed block mounting screw holes and the SESAM fixed block mounting holes.

4. The all-fiber airtight packaging structure with semiconductor saturable absorber mirror of claim 1, wherein:
   two sealing shell wiring pins are defined on the sealing shell, two sealing shell wiring pins are connected to two TEC chilling plate wiring pins by copper wires.

5. The all-fiber airtight packaging structure with semiconductor saturable absorber mirror of claim 1, wherein:
   a gap between the ceramic optical fiber ferrule connector and the sealing shell central hole is filled with ultraviolet curing adhesives.

6. The all-fiber airtight packaging structure with semiconductor saturable absorber mirror of claim 1, wherein:
   the SESAM fixed block, the sealing shell, and the cover plate are made from copper material.

7. The all-fiber airtight packaging structure with semiconductor saturable absorber mirror of claim 1, wherein:
   a tail fiber of the ceramic optical fiber ferrule connector is connected to a mode-locked fiber laser.

8. The all-fiber airtight packaging structure with semiconductor saturable absorber mirror of claim 1, wherein the output end of the ceramic optical fiber ferrule connector faces to the end of the SESAM without an intermediate component located therebetween so that a light output from the output end of the ceramic optical fiber ferrule connector can reach the SESAM directly.

* * * * *